United States Patent [19]

Tam

[11] Patent Number: 4,664,487

[45] Date of Patent: May 12, 1987

[54] LASER MIRROR POSITIONING APPARATUS

[75] Inventor: Yan S. Tam, Canoga Park, Calif.

[73] Assignee: Rockwell International Corporation, El Segundo, Calif.

[21] Appl. No.: 781,828

[22] Filed: Sep. 30, 1985

[51] Int. Cl.$^4$ ............................................. G02B 26/08
[52] U.S. Cl. .................................................... 350/486
[58] Field of Search ............... 350/486, 632, 633, 634, 350/636, 637, 639, 487; 372/107

[56] References Cited

U.S. PATENT DOCUMENTS

| 3,902,084 | 8/1975 | May, Jr. | 318/135 |
| 4,060,314 | 11/1977 | Heinz | 350/633 |
| 4,577,131 | 3/1986 | Soobitsky | 350/487 |

FOREIGN PATENT DOCUMENTS

| 2092770 | 8/1982 | United Kingdom | 350/487 |
| 654927 | 3/1979 | U.S.S.R. | 350/486 |

Primary Examiner—John K. Corbin
Assistant Examiner—Vincent J. Lemmo
Attorney, Agent, or Firm—H. Fredrick Hamann; Harry B. Field; Lawrence N. Ginsberg

[57] ABSTRACT

An apparatus 10 for positioning a laser mirror 16 secured within mirror mount 14. A centrally disposed linear actuator 20 is positioned to impart a force to the mirror mount 14 which is in line with the net center of percussion of the laser mirror 16 and mirror mount 14, thus providing tip/tilt free single point piston actuation. Three tip/tilt actuator assemblies 18,76 equidistantly disposed about the linear actuator 20 provide coarse adjustments and fine tip/tilt actuation. The mirror mount 14 is resiliently connected to the base 12 by support means 24,54.

14 Claims, 7 Drawing Figures

LASER MIRROR POSITIONING APPARATUS

STATEMENT OF GOVERNMENT INTEREST

The Government has rights in this invention pursuant to Contract No. F29601-81-C-0056 awarded by the U.S. Department of the Air Force.

BACKGROUND OF THE INVENTION

1. Field of Invention

This invention relates to an apparatus for mounting and positioning laser mirrors. More particularly, this invention relates to an apparatus for wide bandwidth positioning of laser mirrors in tip and tilt about two orthogonal axes and subwavelength planar translations normal to the mirror surface.

2. Description of the Prior Art

As laser technology has become more sophisticated, the need for more compact and accurate laser positioning devices has greatly increased. Conventional mirror positioning devices utilize various combinations of gears, bearings and gimbals. The accuracy of these conventional devices is limited by mechanical problems such as backlash, which causes unacceptable errors in response and predictability. Stiction, i.e., the difference between the dynamic and static friction with regard to sliding surfaces, also has a substantial effect on the accuracy of conventional mirror positioning devices. Once the combined static force of the precision gimbals and geared actuators is overcome, these devices tend to overreact and move beyond the desired setting. These errors have been compounded by the requirements, in modern laser systems, of not only tip and tilt adjustments of the mirror, but also adjustments of the mirror in the direction normal to the surface of the mirror (translation). Adjustments in this direction are needed if it is desired to change the optical path length of the reflected laser beam. If precise enough, the positioning apparatus can provide subwavelength adjustments of the reflected beam thereby allowing, for example, phasing of an array of originally separate laser beams to form a single coherent beam. However, for a compact mirror positioning device, placing the center of rotation for tip/tilt motions about the center of the mirror's surface is mechanically difficult to achieve. When the center of rotation for tip/tilt is not on the mirror's surface, a translation is induced when the mirror is rotated thereby affecting the position of the mirror in the direction normal to the surface of the mirror.

Perturbations arising from acoustical, thermal, vibrational and maneuvering loads on the adjusting apparatus require a tip/tilt range on the order of 1 milliradian, a translational range on the order of 10 micrometers, and an operating bandwidth in both tip/tilt and translation from direct current to several kilohertz (Khz). To date, a mirror positioning apparatus capable of satisfactorily performing these functions within these ranges has not been demonstrated.

The utilization of actuators formed from stacks of piezoelectric wafers is desirable for laser mirror adjustment devices because of the absence of gears and bearings and consequently the elimination of backlash and stiction. However, translation of the mirror is very difficult to achieve without creating a slight tip or tilt of the mirror face. The reason for this difficulty is that in order to achieve tip/tilt free translation designers have been required to rely upon the concurrent actuation of at least three spaced apart piezoelectric actuators which define the translating plane for the mirror. A lead or lag in any of these actuators results in dynamic (real time) tip or tilt of the mirror, and actuation non-linearity in any of these actuators results in static tip or tilt of the mirror. A conventional piezoelectric translator is manufactured by Burleigh Instruments, Inc. and patented under U.S. Pat. No. 3,902,084.

OBJECTS OF THE INVENTION

Accordingly, it is an object of this invention to provide a laser mirror positioning apparatus with remote positioning capability which is compact yet very precise.

Another object of the present invention is to provide a laser mirror positioning apparatus which is capable of providing moderate range tip/tilt free wide bandwidth actuation of the laser mirror in a direction normal to the surface of the laser mirror.

Yet another object of the present invention is to provide a laser mirror positioning apparatus which provides moderate range translation free wide bandwidth tip/tilt actuation.

Yet still another object of the present invention is to increase the effective output force of conventional piezoelectric translators.

Yet still another object of the present invention is to provide a mirror mounting means which prevents distortion of the mirror face yet allows for easy removal and installation of the same.

Other objects, advantages and novel features of the present invention will become apparent from the following detailed description of the invention when considered in conjunction with the accompanying drawings.

SUMMARY OF THE INVENTION

The present invention provides an apparatus for positioning a laser mirror. In its broadest aspects, the laser mirror positioning apparatus comprises: a base having a forward end; a mirror mount for retaining a laser mirror; resilient support means for connecting the mirror mount to the forward end of the base; and, a linear actuator, attached to the support means for translating the laser mirror in a direction normal to the surface of the mirror. The linear actuator is positioned to impart a force to the mirror mount in line with the net center of percussion of the mirror mount and the laser mirror. In the preferred embodiment the linear actuator comprises a piezoelectric transducer. Three piezoelectric tip/tilt actuators are equidistantly disposed in the circumference about the linear actuator, the circumference being coaxial with the piston actuator. Imparting a force to the mirror mount in line with the net center of percussion allows for tip/tilt free single point piston actuation.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
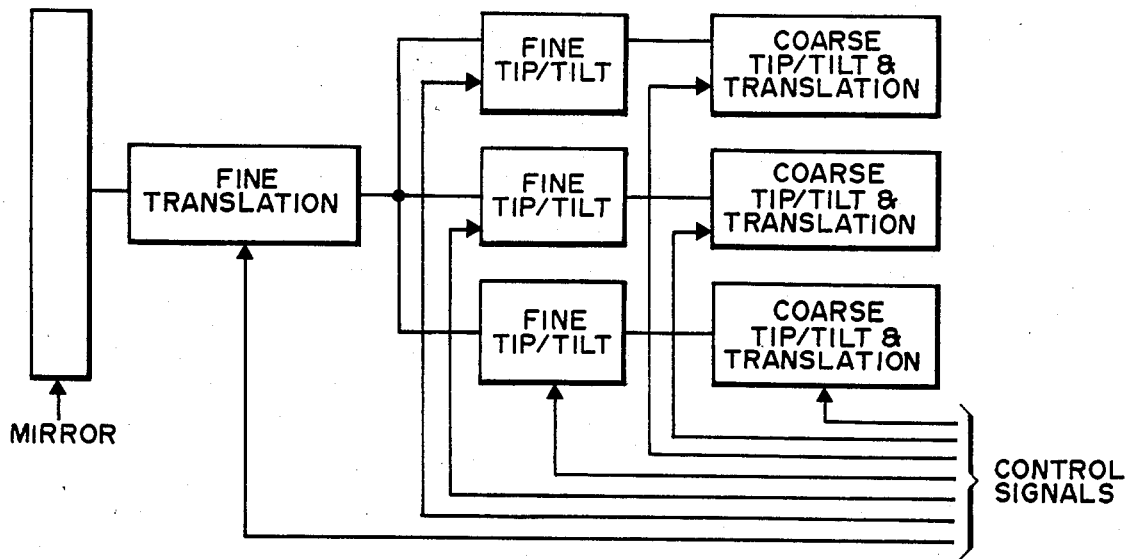
FIG. 1 is a block diagram schematic representation of the actuator arrangement of the laser mirror positioning apparatus.
Figure 3:
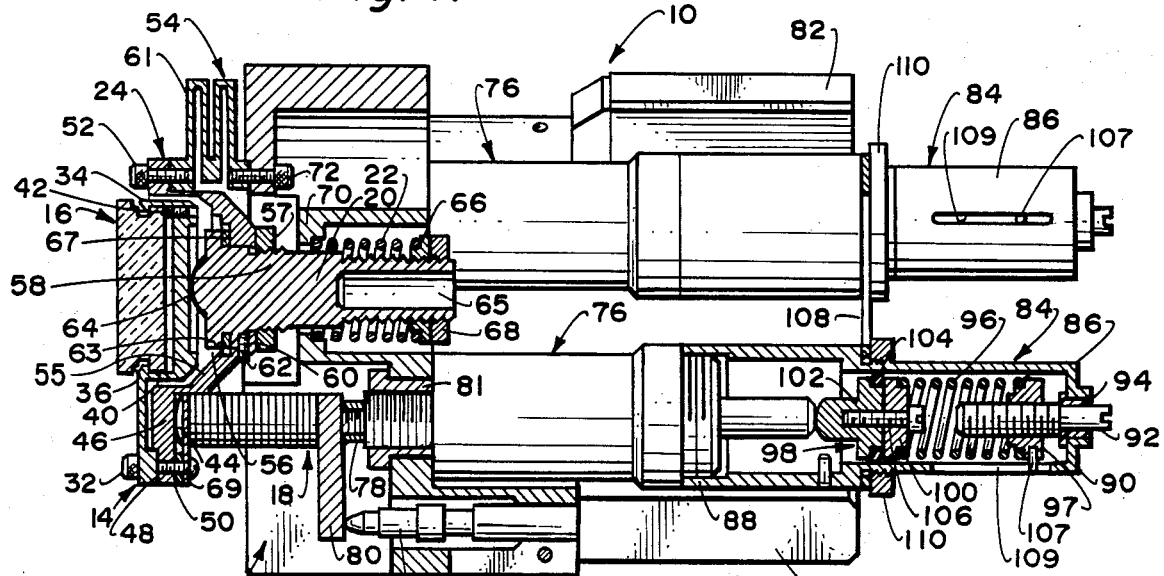
FIG. 3 is a side elevation view of FIG. 2 taken in cross-section.
Figure 2:
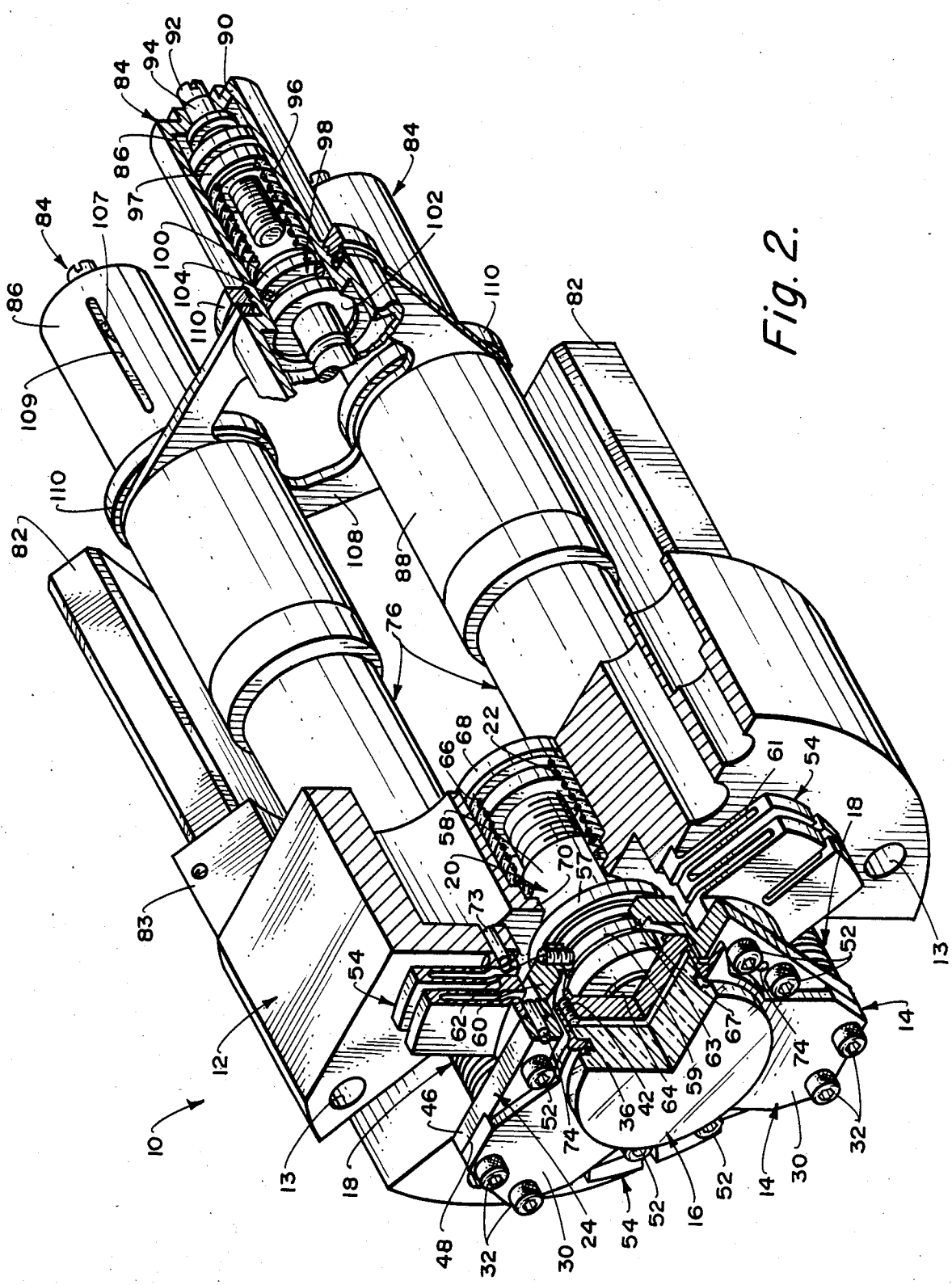
FIG. 2 is a perspective view, partially cut-away, of a preferred embodiment of the laser mirror positioning apparatus.

The laser mirror positioning apparatus of the present invention is capable of both coarse and fine piston (translation) actuation as well as coarse and fine tip/tilt actuation. As noted in the schematic representation shown in FIG. 1, each of the actuation devices for the translation and tip/tilt motions is controlled by independent control signals originated and optimized by a central computer. The positioning apparatus can therefore provide precise high bandwidth remote actuation. Closed-loop automatic actuation can also be provided by closing the control loop with proper feedback signals. Feedback signal sources such as a tilt sensor illuminated by a probe laser beam reflected from the laser mirror surface may be utilized. Referring to FIGS. 2 and 3, the laser mirror positioning apparatus is generally designated as 10. A base 12 of the laser mirror positioning apparatus is mounted by means of holes 13 to the rigid support structure (not shown).

The fine adjustment stage includes a mirror mount 14 for securely holding the laser mirror 16, three fine tip/tilt actuators 18, a linear actuator 20, a preload spring 22, and a reaction plate 24.

The mirror mount 14 has a bayonet design so that the mirror 16, which is centrally located at the forward end of the positioning apparatus 10, is easily installed and removed. As explained below, this design also prevents distortion of the mirror face.

Figure 4:
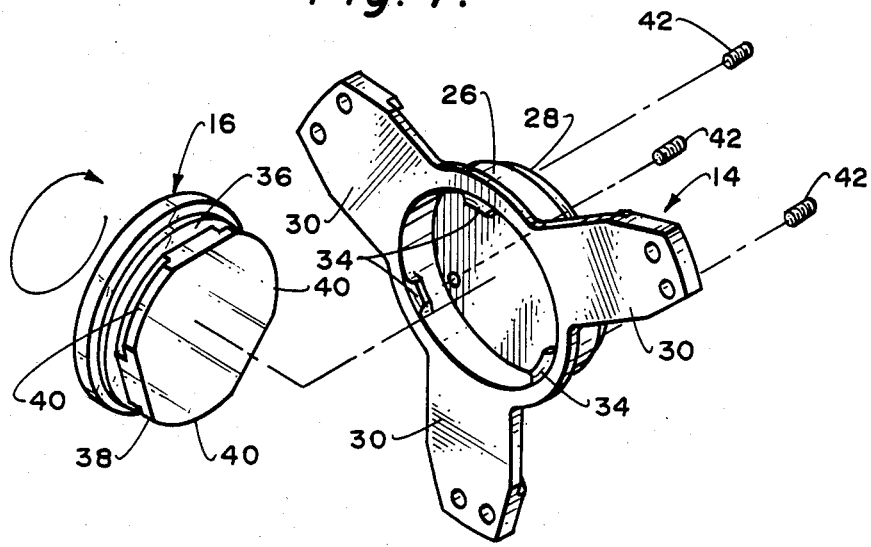
FIG. 4 is a persepctive view of the mirror mount and laser mirror.
Figure 5:
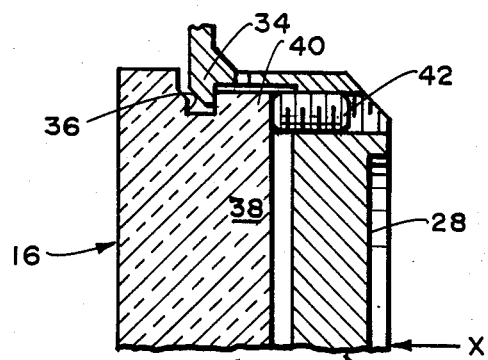
FIG. 5 is a cross-sectional view of the mirror mount with the laser mirror installed.

Referring specifically to FIGS. 4 and 5, the mirror mount has a centrally disposed cylindrical portion 26, a closed back end 28 and three radially outwardly extending relatively thin flexible arms 30. Flexible arms 30 are equidistantly spaced about the circumference of the cylindrical portion 26. The term "flexible" as used to describe the flexible arms means each flexible arm 30 transversely deflects approximately one hundredth of one inch per 270 pounds of transversely applied force. The flexible arms 30 are supported by the reaction plate 24 and are secured to the reaction plate 24 by screws 32. The forward end of the cylindrical portion of the mirror mount 14 has three radially inwardly extending tabs 34 for securing the mirror 16 and axially locating the mirror 16 at a pre-determined position. The mirror mount 14 is preferably comprised of titanium which has a high stiffness-to-weight ratio, high strength-to-weight ratio, high stiffness-to-volume efficiency, and can easily be fabricated using conventional machining techniques.

The mirror 16 is specifically designed to be used with the mirror mount 14. The side of the mirror, near its back end, has a groove 36 extending about its circumference. Additionally, the back end 38 of the mirror 16 is cut away so as to provide three radially outwardly extending projections 40 or bayonets on the side of the mirror 16, equidistantly spaced about the circumference of the mirror.

The mirror 16 is secured into position within the mirror mount 14 by first placing the back end 38 of the mirror 16 within the cylindrical portion 26 of the mirror mount 14. The mirror 16 is then engaged within the mirror mount 14 by rotating the mirror approximately 60° so that the outwardly extending projections 40 on the mirror are held by the corresponding tabs 34 on the mirror mount 14. The mirror 16 is then secured into position by tightening screws 42 which extend through the back end 28 of the mirror mount 14 and are located directly in-line with corresponding tabs 34, thereby forcing the projections 40 on the mirror 16 tightly against the tabs 34 on the mirror mount 14. This also locates the mirror 16 axially to a pre-determined position.

By this design the load, X, created by the actuator 20 in fine translation, follows a path that originates on the back end 28 of the mirror mount 14 and extends through the screws 42 through the outwardly extending projections 40 on the mirror 16 and to the tabs 34 (as seen in FIG. 5). Therefore, distortions on the mirror 16 due to mounting and actuations are essentially localized to the three outwardly extending projections 40 and are thus remote to the mirror face.

The reaction plate 24, which is very rigid and is preferably also formed of titanium, is coaxially located behind mirror mount 14. It reacts to the displacements of the actuation tips 44 of each of the three fine stage tip/tilt actuators 18 and transfers the load to the mirror mount 14 thus providing coarse translation and tip/tilt motions. The reaction plate 24 includes an integral support plate 46 on its forward end which has a surface 48 for supporting the flexible arms 30 of the mirror mount 14. Another surface 50 on the back of the support plate abuts the fine stage tip/tilt actuators 18 (see FIG. 3). Support plate 46 and thus reaction plate 24 are affixed by screws 52 to shear support flexures 54, more specifically described below. Reaction plate 24 has a central cavity 56 for emplacement of the cylindrical portion 26 of the mirror mount 14.

The linear actuator 20, which is substantially centered with respect to the mirror, is a piston actuator which is comprised of a piezoelectric transducer (PZT) which contains a stack of piezoelectric wafers bonded together and electrically wired in parallel. The piezoelectric materials are crystals that expand or contract when excited by a large applied voltage. The piezoelectric wafers are mounted in a cylindrical housing 58. The forward end 59 of the housing 58, in turn, is mounted within a central hole located at the back end 60 of the reaction plate 24. The housing 58 is kept securely and precisely in position within the reaction plate 24 by three equidistantly spaced screws 62 which extend through a wall section 55 the reaction plate 24 into the cavity 56 where they contact the exterior surface of the housing 58 and establish the radial locations of the piston actuator 20. The linear actuator 20 is further secured to the reaction plate 24 in the axial direction by nut 57 which engages threads on the housing 58 of the linear actuator 20.

The preload washer 67, located under the circular extension 63 of the housing 58 and in contact with the forward end of the back end 60 of the reaction plate 24, is designed to preload the mirror mount 14 against the linear actuator 20 thereby maintaining constant contact of the mirror mount with the linear actuator. Thus, stability is achieved under both static and dynamic operating conditions. The amount of the described preload must be exact to prevent overstressing the flexible arms 30 of the mirror mount 14 and yet provide the necessary preload for stability. This is achieved by precise machining of the preload washer 67 to a predetermined thickness according to the actual combined transverse spring rate of the flexible arms 30 and dimensions of the components involved.

The housing 58 is preferably formed of beryllium which is light but very stiff. Using beryllium assures that the fine tip/tilt rotational inertia is low thus improving the frequency response. Also, the high stiffness of the material assures minimal deflection of the housing 58 thus minimizing any loss of piston motion.

During operation, high voltage is applied to the piezoelectric stack causing a piston actuation tip 64, preferably formed of tungsten carbide, which extends from the forward end of the piston actuator assembly 20, to push the mirror mount 14 forward, inducing transverse deflection of the flexible arms 30 of the mirror mount 14, and thereby translating the mirror 16. It is noted, that during this linear motion the reaction plate 24 remains stationary with respect to the housing 58 of piston actuator 20; and likewise the ends of the flexible arms 30 remain stationary with respect to the housing 58. However, the piston actuation tip 64 pushes on the back end of the mirror mount 14, thereby providing fine piston translation of the mirror 16. A hole 65 extends through the back end of the housing 58 for connection of the piston actuator 20 with the drive electronics.

The preload spring 22 around the circumference of the housing 58 is designed to preload the reaction plate 24 thereby maintaining constant contact of the reaction plate with the tip/tilt actuators 18 thus achieving stability under both static and dynamic operating conditions. The back end of the preload spring 22 opposes a washer 66 and preload adjusting nut 68 at the back end of the housing 20. The front end of the prelaod spring 22 opposes a circular extension 70 of the base 12. Thus, the preload spring 22 biases the piston actuator assembly 20 and the reaction plate 24 it is supporting, rearwardly. By adjusting the amount of compression of the preload spring 22 by rotation of the preload adjusting nut 68, the required amount of preload for stability can be achieved according to the actual spring rate of the preload spring 22 and dimensions of the components involved.

Figure 6:
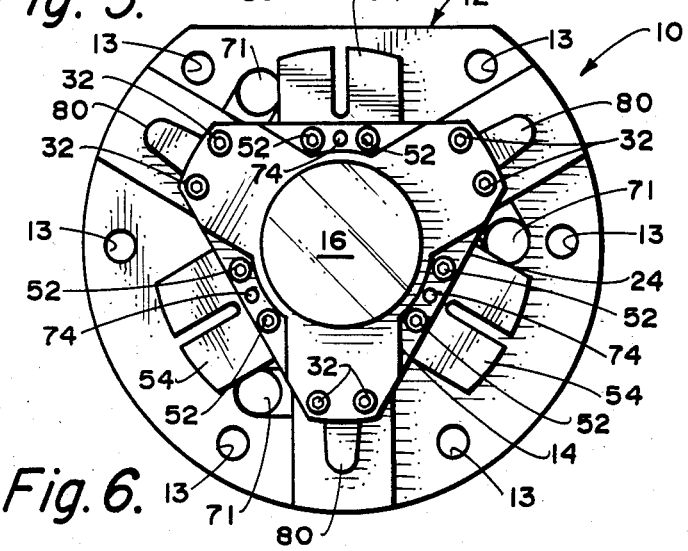
FIG. 6 is a front end view of the laser mirror positioning apparatus.
Figure 7:
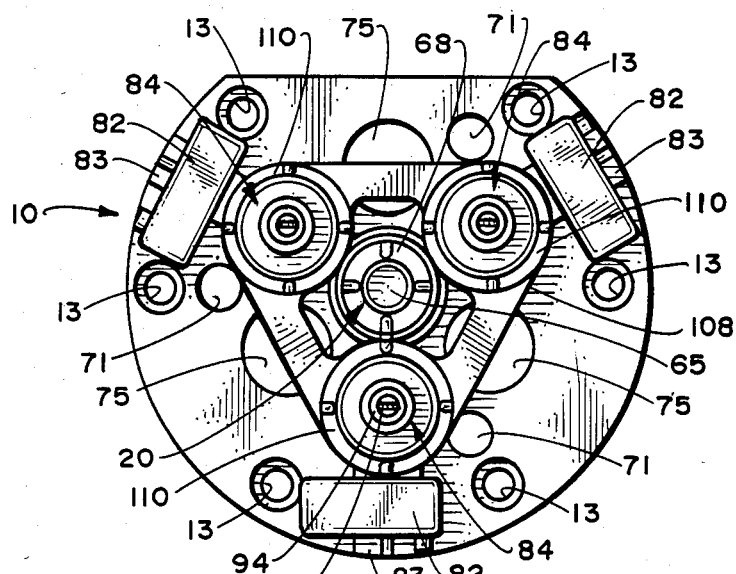
FIG. 7 is a back end view of the laser mirror positioning apparatus.

Each of the three fine tip/tilt actuators 18 includes a PZT; however, unlike the piston actuator 20 in order to minimize weight, no housing is used. A tungsten carbide actuation tip 44 at the forward end of each fine tip/tilt actuator 18 contacts surface 50 of the reaction plate 24 and is supported in the transverse direction by a thin flexure 69 that is attached to the fine tip/tilt actuator 18 at one end and the reaction plate 24 at the other end. The actuation tips 44 are located close to the mirror surface which maintains the center of rotation for the tip/tilt motion very close to the mirror surface and thus eliminates any noticeable tip/tilt induced translations of the mirror in the direction normal to the surface of the mirror from off-plane rotations. The fine tip/tilt actuators 18 are equidistantly disposed, 120° apart from each other, on a circumference about the piston actuator 20, the circumference being coaxial with the piston actuator 20. Wires (not shown) from the fine tip/tilt actuators 18 extend through holes 71 in base 12 (see FIGS. 6 and 7) for connecting the fine tip/tilt actuators 18 to the drive electronics.

The support flexure assembly comprised of three equidistantly spaced shear support flexures 54 resiliently interconnects the reaction plate 24 to the forward end of the base 12. The support flexures 54, like the fine tip/tilt actuators 18, are disposed in a circumference about the piston actuator 20, the circumference being coaxial with the piston actuator 20. The support flexure assembly allows essentially unrestricted movement along the plane normal to the surface of the mirror and it is tangentially and radially very stiff. Each shear support flexure 54 is comprised of two parallel sets of four thin plates 61 arranged in series and connected at alternate ends.

This radially segmented design of the shear support flexures 54 eliminates any cross coupling between the tip and tilt movements. Cross coupling would occur, due to hoop restrain, if the shear support flexure assembly were a single continuous member. One end of each flexure 54 is attached by screws 72 and pin 73 to the base 12 and the other end of each flexure 54 is attached by screws 52 and pin 74 to the reaction plate 24. This arrangement provides a substantially rigid shear resistance thereby providing stiff transverse support to the fine adjustment stage specifically described earlier while maintaining flexibility for precise angular and translational positioning of the mirror 16. Holes 75 in base 12 provide access for installing the support flexure assembly.

Coarse adjustments of the laser mirror positioning apparatus are accomplished by three piezoelectric inchworm actuators 76, i.e., translators which are capable of motion in incremental steps. The inchworm actuators provide coarse piston and coarse tip/tilt movement.

Each inchworm actuator 76 is connected near the back end of, and in series with, a fine tip/tilt actuator 18. The inchworm actuator 76 has a central shaft 78 which is threaded at one end and is screwed in place within a threaded fastener which is integral with the gauge reaction bar 80. The inchworm actuators 76 are connected to the base 12 by a lock nut 81. These actuators are commercially available and typically have a range of approximately 6.3 millimeters.

The gauge reaction bar 80 is bonded (preferably epoxied), to the back end of a piezoelectric wafer stack of a corresponding fine tip/tilt actuator 18. The other end of each gauge reaction bar 80 is in contact with the movable plunger 85 of a linear encoder 82. The gauge reaction bar 80 can therefore provide coarse position verification and coarse tip/tilt information. Linear encoder 82 also provides information for closed loop control of each respective inchworm actuator 76 by responding to changes in the position of the gauge reaction bar 80 thereby generating feedback information to a computer which controls the drive (not shown) for the inchworm actuator. The linear encoders 82 are attached to the base 12 by clamp 83 integral to the base.

A force-balance assembly 84 at the back end of each inchworm actuator is utilized to increase the inchworm's effective output force. The need for force balancing is required due to the low output force of commercially available inchworm actuators.

Each force-balance assembly 84 has a cylindrical cover 86 which, at a front end 88, screws into a back end of an inchworm actuator 76. The back end 90 of each force-balance assembly 84 is closed and has a central hole. One end of an adjustment screw 92 within the cylindrical cover 86, along the central axis of the cylindrical cover 86, extends through the central hole for easy adjustment. A bronze bushing 94 along the inner surface of the central hole acts as a bearing so that the adjustment screw 92 is capable of rotating with minimal friction. A spring 96, which extends along the axis of the cylindrical cover 86, opposes, at the spring's back end, a spring nut 97 which is screwed onto the adjustment screw 92. At its forward end, the spring 96 opposes a plunger assembly 98. The plunger assembly 98 comprises a disc 100 and a piston 102 with a teflon piston seal 104 therebetween. The piston seal 104 functions as a low friction guide for the plunger assembly 98. Screw 106 secures these components. The plunger assembly 98 transmits the force balancing effect of the spring 96 to the inchworm actuator 76. A dowel pin 107 on the spring nut 97 extends through a longitudinally extending slot 109 on the cylindrical cover 86 thereby preventing rotation of the spring nut 97 relative to the cylindrical cover 86.

When the adjustment screw 92 is rotated in one direction the spring nut 97 translates so that the spring 96 becomes more compressed exerting a greater axial force on the inchworm actuator 76. When the direction is reversed the force on the inchworm actuator 76 is decreased. Thus, the aforementioned force-balance assembly effectively counteracts forces such as the shear support flexure 54 and preload spring 22 spring forces.

An inchworm support plate 108 mounted midway on each cylindrical cover 86 by nut 110 interconnects the three inchworm actuators 76 thereby providing transverse support to the same from vibrational effects.

Prior to operating the laser mirror positioning apparatus 10, the piston actuator 20 is aligned with the net effective center of percussion of the mirror mount 14 and the mirror 16 in a plane parallel to the mirror surface. Positioning the piston actuator 20 so that during operation it imparts a force to the mirror mount in line with the net effective center of percussion assures tip/tilt free translation. The center of percussion is well known by those versed in the art and is broadly defined as the point of application of the resultant of all the forces tending to cause a body to rotate about a certain axis. In the instant case, if the spring rates of each of the flexible arms 30 of the mirror mount 14 were identical, and the centers of mass of the mirror 16 and mirror mount 14 were perfectly aligned in the direction planar to the mirror surface, the center of percussion would be centrally located; however, because of manufacturing tolerances the center of percussion should be experimentally determined and the piston actuator aligned therewith prior to operation.

Although it is contemplated that numerous centering procedures are possible, one technique is as follows. The mirror 16, mirror mount 14, piston actuator 20, reaction plate 24 and preload spring 22 are assembled as one assembly. This assembly is mounted onto a fixture designed for this centering procedure. The piston actuator 20 is visually centered and is driven to maximum translation and this maximum range is recorded. Any tip motion of the mirror 16 occurring by this translation may be measured by an interferometer, such as a heterodyne pencil beam interferometer. Then, the assembly is rotated 90° relative to the original position, the piston actuator 20 is actuated again to the maximum value and the corresponding mirror tilt is determined. The magnitude and direction that the piston actuator is required to be repositioned in order for zero piston induced mirror tip/tilt is then obtainable through interpretation of the measured tip/tilt motions and geometric characteristics of the test setup. These characteristics include wavelength of the laser beam, separtion of the two beams in the interferometer, and the angular direction of rotation of the mirror assembly.

Once aligned with the net effective center of percussion the alignment is maintained regardless of the motion by the inchworm actuators or fine tip/tilt actuators because the mirror 16, mirror mount 14, reaction plate 24 and piston actuator 20 move as a rigid body, i.e., with no relative motion among the components.

By arranging the piston and tip/tilt actuators coaxially, long range piezoelectric crystals can be used for acutation providing sufficient tip/tilt and translation range for the fine stage. This allows the coarse stage to be used for initial positioning only thus allowing the inchworm actuators 76 to be in a clamped static mode during the high bandwidth operation (dynamic) mode of the apparatus 10. This improves the mechanical integrity of the system. Furthermore, complexity of the control loops are considerably simplified when short term dynamic response is provided by a single stage, i.e., piston actuator for total fine actuation range without downloading to the coarse stage. Thus, the use of the coarse stage is not necessary for short-term dynamic responses. The linear encoder 82 provides coarse position (including tip/tilt) verification, as previously discussed. In the reduction to practice the inchworm actuators 76 achieved a translation range of approximately 3.50 millimeters with a resoltuion of 0.1 micrometers, and a tip/tilt range of approximately 80 milliradians with a resolution of 4.3 microradians.

After initial positioning, fine stage adjustments are made in response to separate and distinct signals sent to the piston actuator 20 and the fine tip/tilt actuators 18 from high voltage amplifiers which are connected to the computer. In the reduction to practice, fine stage translation of approximately 11 micrometers with a resolution of 0.005 micrometers was achieved and a tip/tilt range of approximately 780 microradians was achieved with a resolution of 0.55 microradians. The operating frequency was from DC to 2 Kilohertz (KHz).

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for positioning a laser mirror, comprising:

a base having a forward end;

a mirror mount for securely retaining said laser mirror, said mirror mount and laser mirror having a net center of percussion;

support means for resiliently interconnecting said mirror mount to said forward end of said base;

linear actuation means attached to said support means for translating said laser mirror in a direction normal to the surface of said mirror, one end of said linear actuation means positioned for imparting a force to said mirror mount in line with said net center of percussion; and a plurality of tip/tilt actuation means engageable with said support means, each of said tip/tilt actuation means equidistantly disposed in a circumference about said linear actuation means, said circumference being coaxial with said linear actuation means.

2. The apparatus of claim 1 wherein said support means includes:

a rigid reaction plate coaxially located behind said mirror mount, said reaction plate having:

a first surface for supporting said mirror mount, a second surface abutting said tip/tilt actuation means, said second surface reacting to displacements of said tip/tilt actuation means, and a back end having a central bore therethrough for receiving a portion of said linear actuation means; and, support flexure means for mounting said reaction plate on said forward end of said base.

3. The apparatus of claim 2 wherein:

said support flexure means includes a plurality of support flexures disposed in a circumference about said linear actuation means, said circumference being coaxial with said linear actuation means, each of said support flexures connected at one end to said reaction plate and at a second end to said forward end of said base.

4. The apparatus of claim 3, wherein each of said tip/tilt actuation means comprises a piezoelectric transducer (PZT).

5. The apparatus of claim 4, further including:

a plurality of piezoelectric coarse adjustment inchworm actuators each of said inchworm actuators being disposed behind and in series with a respective tip/tilt actuator thereby contacting and capable of positioniong said tip/tilt actuator for allowing coarse adjustments of said mirror.

6. The apparatus of claim 5, further including a force balance assembly attached at the back end of each of said inchworm actuators, said force balance assembly including:

a cylindrical cover having a closed back end with a central hole therethrough and a threaded forward end, said threads provided for attaching said force balance assembly to said inchworm actuator;

an adjustment screw having a portion extending within said cylindrical cover along a central axis of said cylindrical cover and a back end portion of said screw extending through said central hole;

a nut threaded onto said portion extending within said cylindrical cover;

means for preventing rotation of said nut relative to said cylindrical cover thus preventing rotation of said nut with said adjustment screw; and, a spring extending within said cylindrical cover along a central axis of said cylindrical cover said spring having a first end opposing said nut and a second end opposing said inchworm actuator; whereby, when said adjustment screw is rotated in one direction said nut translates so that the spring becomes more compressed and it exerts a greater force on said inchworm actuator and when said adjustment screw is rotated in the reverse direction the compressive force on said inchworm actuator is decreased thereby adjustably increasing the inchworm actuator's effective output force.

7. The apparatus of claim 6 wherein:

said means for preventing rotation of said nut includes a pin connected to said nut extending through a longitudinally extending slot on said cylindrical cover thereby allowing translation of said nut but preventing its rotation.

8. The apparatus of claim 1 wherein:

said linear actuation means comprises a single piston actuator utilizing a piezoelectric transducer (PZT).

9. The apparatus of claim 1 wherein said mirror mount comprises:

a central cylindrical portion for accepting said mirror, said cylindrical portion having a plurality of radially inwardly extending tabs for securing said mirror into position, said mirror having a groove extending about its circumference on the side of said mirror near a back end thereof and having the back end of the mirror cut away so as to provide a plurality of radially outwardly extending projections on the side of said mirror, said projections being equidistantly spaced about the circumference of said mirror, said projections being held by said tabs when said back end of said mirror is inserted into said cylindrical portion and then rotated; and, a plurality of equidistantly spaced radially outward extending flexible arms for connecting said mirror mount to said reaction plate.

10. The apparatus of claim 9, wherein said mirror mount further includes:

a closed back end with screws extending therethrough, each of said screws directly in-line with a corresponding tab, wherein when said mirror is inserted into said mirror mount and rotated into correct position said screws may be tightened, securely engaging said projections with said tabs, thereby securing the mirror within said mirror mount.

11. An apparatus for positioning a laser mirror, comprising:

a base having a forward end;

a mirror mount for securely retaining said laser mirror, said mirror mount and laser mirror having a net center of percussion;

support means for resiliently interconnecting said mirror mount to said forward end of said base, said support means including a rigid reaction plate coaxially located behind said mirror mount, said reaction plate having:

a surface for supporting said mirror mount, and a wall section;

linear actuation means attached to said support means for translating said laser mirror in a direction substantially normal to the surface of said mirror; and radial adjustment means connected to said wall section for adjustably supporting said linear actuation means in a radial direction wherein one end of said linear actuation means is positioned for imparting a force to said mirror mount in line with said net center of percussion.

12. The apparatus of claim 11 wherein said wall section is substantially cylindrical.

13. The apparatus of claim 12 wherein said wall section has a plurality of equidistantly spaced holes along a circumference and said adjustment means includes a plurality of screws each fitting within a respective hole for positioning said linear actuation means so that during operation it imparts a force to said mirror mount in line with said net center of percussion.

14. The apparatus of claim 11 wherein: said linear actuation means comprises a single piston actuator utilizing a piezoelectric transducer (PZT).

* * * * *